(12) United States Patent
Son et al.

(10) Patent No.: US 11,296,343 B2
(45) Date of Patent: Apr. 5, 2022

(54) CATHODE INLET HUMIDITY SENSING WITH OXYGEN SENSOR

(71) Applicant: Ford Global Technologies, LLC, Dearborn, MI (US)

(72) Inventors: Seha Son, Ann Arbor, MI (US); Richard E. Soltis, Saline, MI (US); Jeffrey Scott Hepburn, Birmingham, MI (US); William Frederick Sanderson, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 16/777,209

(22) Filed: Jan. 30, 2020

(65) Prior Publication Data

US 2021/0242478 A1 Aug. 5, 2021

(51) Int. Cl.

| | | |
|---|---|---|
| *H01M 8/04* | (2016.01) |
| *H01M 8/04492* | (2016.01) |
| *H01M 8/04119* | (2016.01) |
| *H01M 8/0444* | (2016.01) |
| *H01M 8/04029* | (2016.01) |
| *H01M 8/04111* | (2016.01) |
| *H01M 8/04992* | (2016.01) |
| *B60L 50/72* | (2019.01) |
| *H01M 8/04828* | (2016.01) |

(52) U.S. Cl.
CPC ......... *H01M 8/04507* (2013.01); *B60L 50/72* (2019.02); *H01M 8/04029* (2013.01); *H01M 8/04111* (2013.01); *H01M 8/04126* (2013.01); *H01M 8/04455* (2013.01); *H01M 8/04835* (2013.01); *H01M 8/04992* (2013.01); *H01M 2250/20* (2013.01)

(58) Field of Classification Search
CPC ......... H01M 8/04029; H01M 8/04111; H01M 8/04126; H01M 8/04455; H01M 8/04507; H01M 8/04798; H01M 8/04835; H01M 8/04992; H01M 2250/20; B60L 50/72
See application file for complete search history.

(56) References Cited

U.S. PATENT DOCUMENTS

| 8,551,664 B2 | 10/2013 | Tighe et al. |
| 8,691,451 B2 | 4/2014 | Kwon |
| 10,141,591 B2 | 11/2018 | Sugiyama et al. |

(Continued)

*Primary Examiner* — Brittany L Raymond
(74) *Attorney, Agent, or Firm* — David B. Kelley; Brooks Kushman P.C.

(57) ABSTRACT

A fuel cell system includes a stack of proton exchange membrane (PEM) fuel cells defining a body, the body including a coolant inlet and coolant outlet, a cathode inlet and cathode outlet corresponding to a cathode, an anode inlet and an anode outlet corresponding to an anode. The fuel cell system also includes a cathode humidifier fluidly connected to the cathode inlet to provide a humidified inlet stream to the cathode inlet, an oxygen sensor positioned upstream of the cathode inlet and downstream of the cathode humidifier, and configured to measure oxygen content of the humidified inlet stream, and a controller connected to the cathode humidifier and the oxygen sensor and configured to operate the cathode humidifier based on the oxygen content of the humidified inlet stream.

17 Claims, 5 Drawing Sheets

(56) References Cited

U.S. PATENT DOCUMENTS

| | | | | |
|---|---|---|---|---|
| 2002/0164509 A1* | 11/2002 | Wheat | ................... | H01M 8/045 |
| | | | | 429/413 |
| 2008/0014478 A1* | 1/2008 | Tighe | ................ | H01M 8/04089 |
| | | | | 429/413 |
| 2010/0304234 A1* | 12/2010 | Kwon | ............... | H01M 8/04753 |
| | | | | 429/413 |

* cited by examiner

CATHODE INLET HUMIDITY SENSING WITH OXYGEN SENSOR

TECHNICAL FIELD

The present disclosure relates to a system and method of detecting humidity at a cathode inlet of a fuel cell stack, and more particularly, using an oxygen sensor to measure humidity at the cathode inlet.

BACKGROUND

Fuel cell stacks typically include hundreds of individual fuel cells. A single conventional fuel cell consists of a membrane electrode assembly (MEA) and two flow-field plates which deliver about 0.5 to 1 V during operation. Individual fuel cells are stacked to form the fuel cell stack, and arranged such that a collective supply manifold for fluid feeds is provided to openings of the cathode, anode, and coolant How fields. Similar to batteries, the fuel cell slack achieves higher voltage and power output when compared with an individual cell.

One type of fuel cell stack conventionally used in vehicles is the proton exchange membrane (PEM) fuel cell which includes a plurality of membrane-electrode interfaces, where the membrane may be a solid polymer membrane electrolyte positioned between an anode and cathode. The anode and cathode are connected to respective current collectors, with openings for gas distribution for the reactants entering and exiting the fuel cell. The cells are operated in a humidified state to maintain performance. Water is produced on the cathode side of the membrane at the catalyst layer. Therefore, water vapor has an easier path to move away from the membrane, through the gas diffusion layer, to the cathode flow field. Thus, the overall hydration level of the membrane is strongly influenced by the cathode flow stream, which has a stronger mechanism for de-hydrating the membrane because of higher flow rates on the cathode side. If the PEM is not adequately humidified, the conductivity of the protons in the membrane decreases which can impact cell performance. Furthermore, as the level of membrane hydration decreases, the internal resistance may increase, reducing the output voltage and thus power. Additionally, low humidity can cause the PEM to dry out which may result in degradation of the membrane over time. On the other hand, excess humidity also can cause issues in performance by inhibiting the reactants from diffusing to the catalyst sites. This result is caused by Hooding of the electrodes and gas channels if the water removal is insufficient, reducing the PEM's efficiency and power.

Therefore, control of the cathode inlet hydration level has a strong influence on the overall hydration level of the slack membranes, and the humidity level at the cathode side inlet into a PEM fuel cell stack is important for overall operation of the fuel cell stack. Thus, a humidity sensor is typically provided at the cathode inlet to measure the humidity level. Controlling the water balance for the PEM requires accurate water concentration measurements at temperatures approaching 100° C. and pressures up to 3 bar absolute, often at or near saturation levels. Non-industrial humidity sensing technologies typically cannot meet the demands under harsh environments. Since the humidity level as well as temperature level at the cathode inlet often far exceed the normal ambient levels, the systems conventionally require specially designed instrument-grade humidity sensors. However conventional instrument-grade sensors are far more costly than commercially available non-industrial humidity sensors.

SUMMARY

According to one or more embodiments, a fuel cell system includes a stack of proton exchange membrane (PEM) fuel cells defining a body, the body including a coolant inlet and coolant outlet, a cathode inlet and cathode outlet corresponding to a cathode, an anode inlet and an anode outlet corresponding to an anode. The fuel cell system also includes a cathode humidifier fluidly connected to the cathode inlet to provide a humidified inlet stream to the cathode inlet, an oxygen sensor positioned upstream of the cathode inlet and downstream of the cathode humidifier, and configured to measure oxygen content of the humidified inlet stream, and a controller connected to the cathode humidifier and the oxygen sensor and configured to operate the cathode humidifier based on the oxygen content of the humidified inlet stream.

According to at least one embodiment, the fuel cell system may further include an air compressor fluidly connected to the cathode humidifier to provide an inlet air stream to the cathode humidifier such that water vapor is added to the inlet air stream to form the humidified inlet stream exiting the cathode humidifier. In a further embodiment, the cathode humidifier may be fiddly connected to the cathode inlet via a valve upstream of the oxygen sensor to control a flow of the humidified inlet stream to the cathode. In at least another embodiment, the fuel cell system may further include an air compressor fluid) connected to the cathode inlet and providing an inlet air stream upstream of the oxygen sensor and cathode humidifier, such that a water vapor stream is added to the inlet air stream from the cathode humidifier to form the humidified inlet stream, and the cathode humidifier may be fluidly connected to the inlet air stream by a valve such that the water vapor stream is controlled. In at least one embodiment, the fuel cell system may include a temperature sensor and a pressure sensor, both of the temperature and pressure sensors located downstream of the cathode humidifier and upstream of the oxygen sensor. In at least one embodiment, the oxygen sensor may be a universal exhaust gas oxygen (UEGO) sensor.

According to one or more embodiments, a vehicle includes a stack of proton exchange membrane (PEM) fuel cells arranged to provide power to the vehicle and defining a body, the body including a coolant inlet and coolant outlet, a cathode inlet and cathode outlet corresponding to a cathode, an anode inlet and an anode outlet corresponding to an anode. The vehicle further includes a cathode humidifier fluidly connected to the cathode inlet to provide a humidified inlet stream to the cathode via the cathode inlet: an oxygen sensor downstream of the cathode humidifier and upstream of the cathode inlet to measure an oxygen content of the humidified inlet stream; and a controller connected to the cathode humidifier and the oxygen sensor. The controller is configured to determine a relative humidity of the humidified inlet stream based on the oxygen content provided from the oxygen sensor, and, upon the relative humidity being less than a predefined threshold humidity, operate the cathode humidifier to increase the relative humidity.

According to one or more embodiments, the oxygen sensor may be a universal exhaust gas oxygen (UEGO) sensor. In at least one embodiment, the vehicle may further include an air compressor fluidly connected to the cathode humidifier such that water vapor is added to the inlet air stream to form the humidified inlet stream. In a further embodiment, the cathode humidifier may be fluidly connected to the cathode inlet via a valve upstream of the oxygen sensor such that the controller operates the valve to control a flow of the humidified inlet stream to the cathode. In at least another embodiment, the vehicle may include an air compressor fluidly connected to the cathode inlet and providing an inlet air stream upstream of the oxygen sensor and cathode humidifier, such that a water vapor stream is added to the inlet air stream from the cathode humidifier to form the humidified inlet stream, and the cathode humidifier may be fluidly connected to the inlet air stream by a valve such that the controller operates the valve to control the water vapor stream added to the inlet air stream. In one or more embodiments, the vehicle may include a temperature sensor and a pressure sensor, both sensors located downstream of the cathode humidifier and upstream of the oxygen sensor, the temperature and pressure sensors providing temperature and pressure data, respectively, to the controller for determining relative humidity. In at least one embodiment, the controller may be further configured to, upon the relative humidity being more than or equal to the predefined threshold humidity and less than a maximum humidity, operate the cathode humidifier to maintain the relative humidity. In a yet at least another embodiment, the controller may further be configured to upon the relative humidity being more than the maximum humidity, operate the cathode humidifier to reduce the relative humidity to below the maximum humidity.

According to one or more embodiments, a fuel cell system includes a stack of proton exchange membrane (PEM) fuel ceils defining a body, the body including a coolant inlet and coolant outlet, a cathode inlet and cathode outlet corresponding to a cathode, an anode inlet and an anode outlet corresponding to an anode. The fuel cell system also includes a cathode humidifier fluidly connected to the cathode inlet to provide a humidified inlet stream to the cathode inlet; an oxygen sensor positioned upstream of the cathode inlet and downstream of the cathode humidifier, and configured to measure oxygen content of the humidified inlet stream; and a controller connected to the cathode humidifier and the oxygen sensor. The controller is configured to operate the cathode humidifier based on the oxygen content of die humidified inlet stream such that upon the relative humidity being less than a predefined threshold humidity, the cathode humidifier increases the relative humidity, and upon the relative humidity being mom than or equal to the predefined threshold humidity and less than a maximum humidity, the cathode humidifier maintains tire relative humidity.

According to at least one embodiment, the controller may be further configured to, upon the relative humidity being more than the maximum humidity, operate the cathode humidifier to reduce the relative humidity to below the maximum humidity. In certain embodiments, the oxygen sensor may be a universal exhaust gas oxygen (UEGO) sensor. In one or more embodiments, the fuel cell system may include an air compressor fluidly connected to the cathode humidifier to provide an inlet air stream to the cathode humidifier such that water vapor is added to the inlet air stream to form the humidified inlet stream exiting the cathode humidifier, and the cathode humidifier may be fluidly connected to the cathode inlet via a valve upstream of the oxygen sensor to control a flow of the humidified inlet stream to the cathode. In at least one embodiment, the fuel cell system may include an air compressor fluidly connected to the cathode inlet and providing an inlet air stream upstream of the oxygen sensor and cathode humidifier, wherein the cathode humidifier is fluidly connected to the inlet air stream by a valve that controls a water vapor stream added to the inlet air stream to form the humidified inlet stream. In one or more embodiments, the fuel cell system may further include a temperature sensor and a pressure sensor, both of the temperature and pressure sensors located downstream of the cathode humidifier and upstream of the oxygen sensor.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this disclosure are to be understood as modified by the word "about" in describing the broader scope of this disclosure. Practice within the numerical limits staled is generally preferred. Also, unless expressly stated to the contrary, the description of a group or class of materials by suitable or preferred for a given purpose in connection with the disclosure implies that mixtures of any two or more members of the group or class may be equally suitable or preferred. Furthermore, practice within the numerical limits stated is generally preferred.

According to one or more embodiments, a system and method for determining humidity at the cathode inlet of a proton exchange membrane (PEM) fuel cell stack is provided. The fuel cell system includes an oxygen sensor, such as, for example, a universal exhaust gas oxygen (UEGO) sensor at a cathode inlet for measuring oxygen content of the stream entering the cathode inlet. The UEGO sensor measures the oxygen content under harsh conditions. Although a UEGO sensor may be discussed interchangeably with an oxygen sensor hereinafter, any oxygen sensor capable of withstanding the harsh environment is contemplated. Upon measuring the oxygen content, the humidity level of the cathode inlet stream can be determined. Furthermore, a controller may determine the humidity level of the inlet stream to the cathode and based on the humidity level, operate a cathode humidifier to adjust the relative humidity of the stream. As such, an alternative to directly measuring humidity is provided.

The oxygen sensor, or interchangeably, the UEGO sensor is able to measure the oxygen concentration level as it becomes diluted by water during the humidification process. The UEGO sensor has been designed for oxygen measurement (volume percent) inside the exhaust pipe of an internal combustion engine, and as such has been successfully tried and tested in measuring oxygen volume percent under harsh conditions as nearly all gasoline vehicles, as well as many diesel powertrains, employ UEGO sensors as part of the engine control and aftertreatment systems to meet emission requirements. Thus, by measuring the dilution of the oxygen in the air at the cathode inlet, the humidity level of the stream can be determined using the reduced oxygen volume percent to that of water vapor, with comparable accuracy to the conventional instrument grade humidity sensor.

Figure 1:
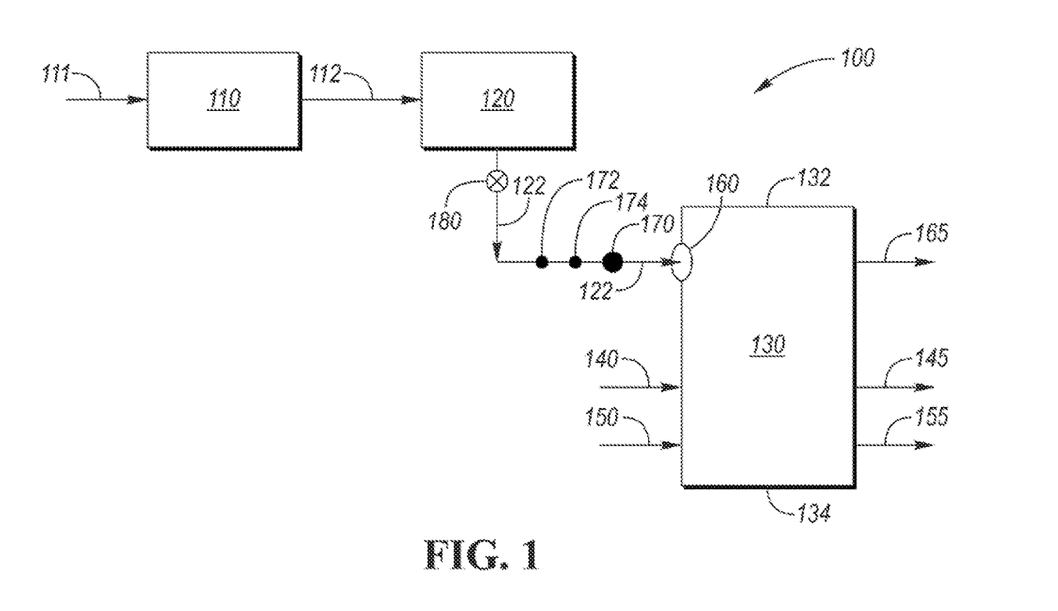
FIG. 1 is a schematic diagram of a fuel cell system, according to an embodiment.

Referring to FIG. 1, a fuel cell system 100 is provided according to an embodiment. An air compressor 110 takes air 111 and provides an inlet air stream 112 to a cathode humidifier 120. The cathode humidifier provides water vapor to the inlet air stream 112 to increase the relative humidity of the inlet air stream 112, forming humidified inlet stream 122. Cathode humidifier 120 may be any suitable humidifier to provide water vapor to the inlet air stream 122, such as, but not limited to a gas-to-gas humidifier. Humidified inlet stream 122 is provided to a fuel cell slack 130 of proton exchange membrane (PEM) fuel cells. The fuel cell stack 130 has a cathode side 132 of the membrane, and an anode side 134 opposite the cathodic side. Stack 130 is defined by a housing or, interchangeably a body, and includes a coolant inlet 140 and coolant outlet 145, an anode inlet 150 and anode outlet 155 (for gas such as hydrogen), and a cathode inlet 160 and cathode outlet 165. Cathode inlet 160 receives the humidified inlet stream 122 from the cathode humidifier 120. The oxygen sensor 170 (e.g., UEGO sensor) is positioned along the humidified inlet stream 122 between the cathode humidifier 120 and the cathode inlet 160 to measure the oxygen content of the air in humidified inlet stream 122. The humidified inlet stream 122 may also include other sensors between the cathode humidifier 120 and the cathode inlet 160, such as, but not limited to temperature sensor 172 and pressure sensor 174. In the embodiment of FIG. 1, the inlet air stream 122 is provided directly to the cathode humidifier. The fuel cell system 100 further includes a valve 180 on a downstream side of the cathode humidifier 120 and upstream of the sensors 170, 172, 174. Valve 180 controls a flow of the humidified inlet stream 122 from the cathode humidifier 120 to the cathode inlet 160 such that a relative humidity of the stream can be adjusted.

In one or more embodiments, with reference to the embodiment of FIG. 1 as an example, a controller (not shown) is operably connected to the valve 180, and receives input from the oxygen, temperature, and pressure sensors 170, 172, and 174, respectively. The controller is configured to determine relative humidity from the oxygen measurement from the oxygen sensor, and by using the temperature and pressure data of the humidified inlet stream 122. Determining the relative humidity includes converting the oxygen content to a water content (as shown below by EQ. 1-EQ. 6), measuring the total pressure of the humidified inlet stream, and calculating the partial pressure of water in the humidified inlet stream. From the partial pressure, the controller determines relative humidity by dividing the saturation pressure using the temperature measurement of the humidified inlet stream. Additionally, in certain embodiments, the controller is configured to compare the relative humidity of the humidified inlet stream 122 with a predefined threshold humidity level. This predefined threshold humidity level is based on the healthy operation of the PEM fuel stack 130 such that the membranes do not dry out. If the relative humidity of the humidified inlet stream 122 is less than the predefined threshold humidity level, the controller signals the valve 180 to adjust flow (i.e., increase flow) to increase the humidity of the humidified inlet stream 122, based on the cathode humidifier 120 adding water vapor to the inlet air stream 122. As such, by adding water vapor to the air inlet stream 112, a more saturated humidified inlet stream 122 can be formed to increase the relative humidity. When the relative humidity level is equal to or greater than the predefined threshold humidity level, the valve and cathode humidifier is controlled to maintain the relative humidity level under a maximum humidity level. Upon the relative humidity level being greater than or equal to the maximum humidity level, the controller operates the valve and cathode humidifier to reduce the relative humidity of the humidified stream by, for example, diluting the humidified stream with dry air.

Figure 2:
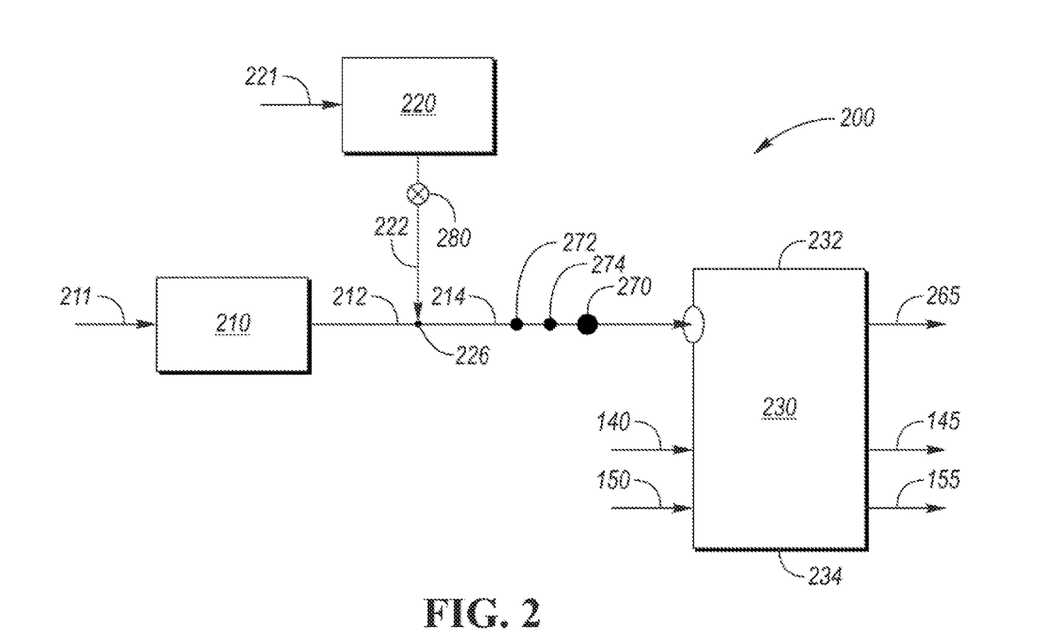
FIG. 2 is a schematic diagram of a fuel cell system, according to another embodiment.

Referring to FIG. 2, a fuel cell system 200 is provided according to another embodiment. An air compressor 210 lakes air 211 and provides an inlet air stream 212. Inlet air stream 212 is provided to a fuel cell stack 230 of proton exchange membrane (PEM) fuel cells. The fuel cell slack 230 has a cathode side 232 of the membrane, and an anode side 234 opposite the cathodic side. Stack 230 is defined by a housing or, interchangeably a body, and includes a coolant inlet 240 and coolant outlet 245, an anode inlet 250 and anode outlet 255 (for gas such as hydrogen), and a cathode inlet 260 and cathode outlet 265. Cathode inlet 260 receives air from the inlet air stream 212. Inlet air stream 212 can be humidified by water vapor added from a cathode humidifier 220. The cathode humidifier 220 provides a humidified air stream 222 front dry air 221 water vapor to be combined with the inlet air stream 212 to increase the relative humidity of the inlet air stream 212, forming a humidified inlet stream 214 downstream of the water vapor addition point 224. The oxygen sensor 170 (e.g., UEGO sensor) is positioned along the humidified inlet stream 214 between the water vapor addition point 224 and the cathode inlet 260 to measure the oxygen content of the air in humidified inlet stream 214. The humidified inlet stream 214 may also include other sensors between the water vapor addition point 224 and the cathode inlet 260, such as, but not limited to temperature sensor 272 and pressure sensor 274. In the embodiment of FIG. 2, the inlet air stream 212 is provided as a vapor stream upstream of the cathode inlet 260. The fuel cell system 200 further includes a valve 280 between the cathode humidifier 220 and the inlet air stream 212 such that the cathode humidifier 220 can provide water vapor to the air inlet stream 212 via the water vapor addition point 224. The water vapor addition point 224 is upstream of the sensors 270, 272, 274. Valve 280 controls a flow water vapor from the cathode humidifier 220 to air inlet stream 212 such that a relative humidity of the stream can be adjusted to provide a humidified inlet stream 214 to the cathodic inlet 260.

In one or more embodiments, with reference to the embodiment of FIG. 2 as another example, a controller (not shown) is operably connected to the valve 280, and receives input from the oxygen, temperature, and pressure sensors 170, 172, and 174, respectively. The controller is configured to determine relative humidity from the oxygen measurement from the oxygen sensor, and by using the temperature and pressure data of the humidified inlet stream 122. Determining the relative humidity includes converting the oxygen content to a water content (as shown below by EQ. 1-EQ. 6), measuring the total pressure of the humidified inlet stream, and calculating the partial pressure of water in the humidified inlet stream. From the partial pressure, the controller determines relative humidity by dividing the saturation pressure using the temperature measurement of the humidified inlet stream. Additionally, in certain embodiments, the controller is configured to compare the relative humidity of the humidified inlet stream 214 with a predefined threshold humidity level. This predefined threshold humidity level is based on the healthy operation of the PEM fuel stack 230 such that the membranes do not dry out. If the relative humidity of the humidified inlet stream 214 is less than the predefined threshold humidity level, the controller signals the valve 280 to adjust flow of water vapor to the air inlet stream 212 (e.g., increase flow) to increase the humidity of the humidified inlet stream 214. As such, by adding water vapor to the air inlet stream 212, a more saturated humidified inlet stream 214 can be formed downstream of the water vapor addition point 224 to increase the relative humidity provided at the cathode inlet 260. When the relative humidity level is equal to or greater than the predefined threshold humidity level, the valve 280 and cathode humidifier 220 is controlled to maintain the relative humidity level under a maximum humidity level, and may provide a continuous flow of vapor in some embodiments, a variable flow in other embodiments, or may stop flow of water vapor in yet other embodiments. Upon the relative humidity level being greater than or equal to the maximum humidity level, the controller operates the valve 280 to reduce the relative humidity of the humidified stream by, for example, closing the valve 280 to prevent water vapor from being added to the air inlet stream 212, or in other embodiments, reducing water vapor flow through the valve 280 to provide a less humid stream to the cathode inlet 260.

Figure 3:
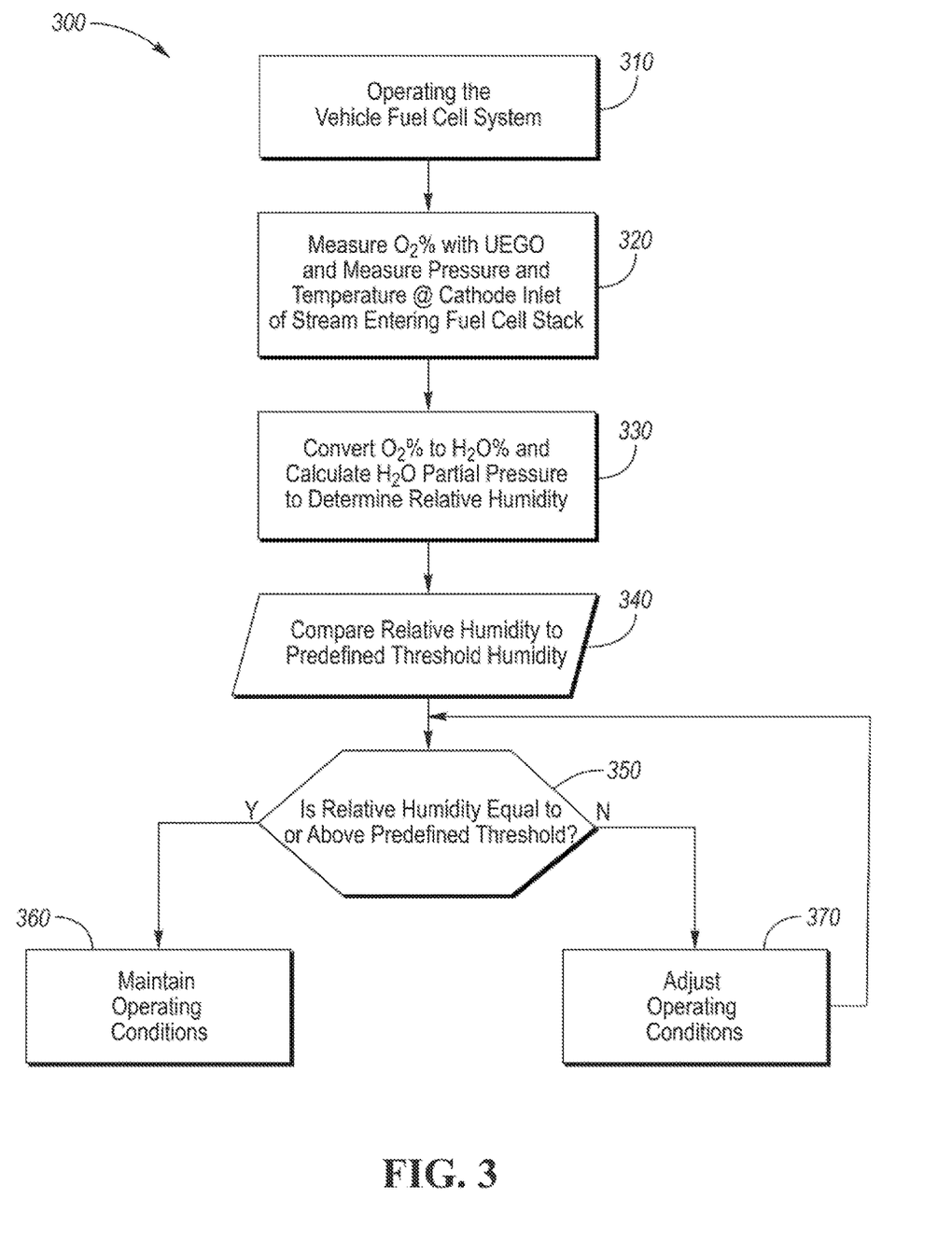
FIG. 3 is a flow chart of a method of operating a fuel cell system, according to an embodiment.

Referring to FIG. 3, a method 300 of operating a fuel cell system is provided. Although the method refers to UEGO sensors, any suitable oxygen sensor may be contemplated. At step 310, the fuel cell stack is operated to provide propulsion to the vehicle. At step 320, the UEGO sensor measures the oxygen content, temperature, and pressure at the cathode inlet of the humidified air entering the fuel cell stack. The oxygen content is then converted, at step 330, to an $H_2O$ content by, for example, a controller. Furthermore, the controller calculates the partial pressure of $H_2O$ to determine the relative humidity at the cathode inlet. At step 340, the relative humidity is compared to a predefined threshold humidity. If, at block 350, the relative humidity is equal to or above the predefined threshold, the operating conditions of the system are maintained at step 360 (i.e., the cathode humidifier is operated to maintain the relative humidity above the predefined threshold). If the relative humidity is less than the predefined threshold humidity, at step 370, the controller operates the cathode humidifier and the valves to adjust the relative humidity of the humidified inlet stream until step 350 is satisfied.

Figure 4:
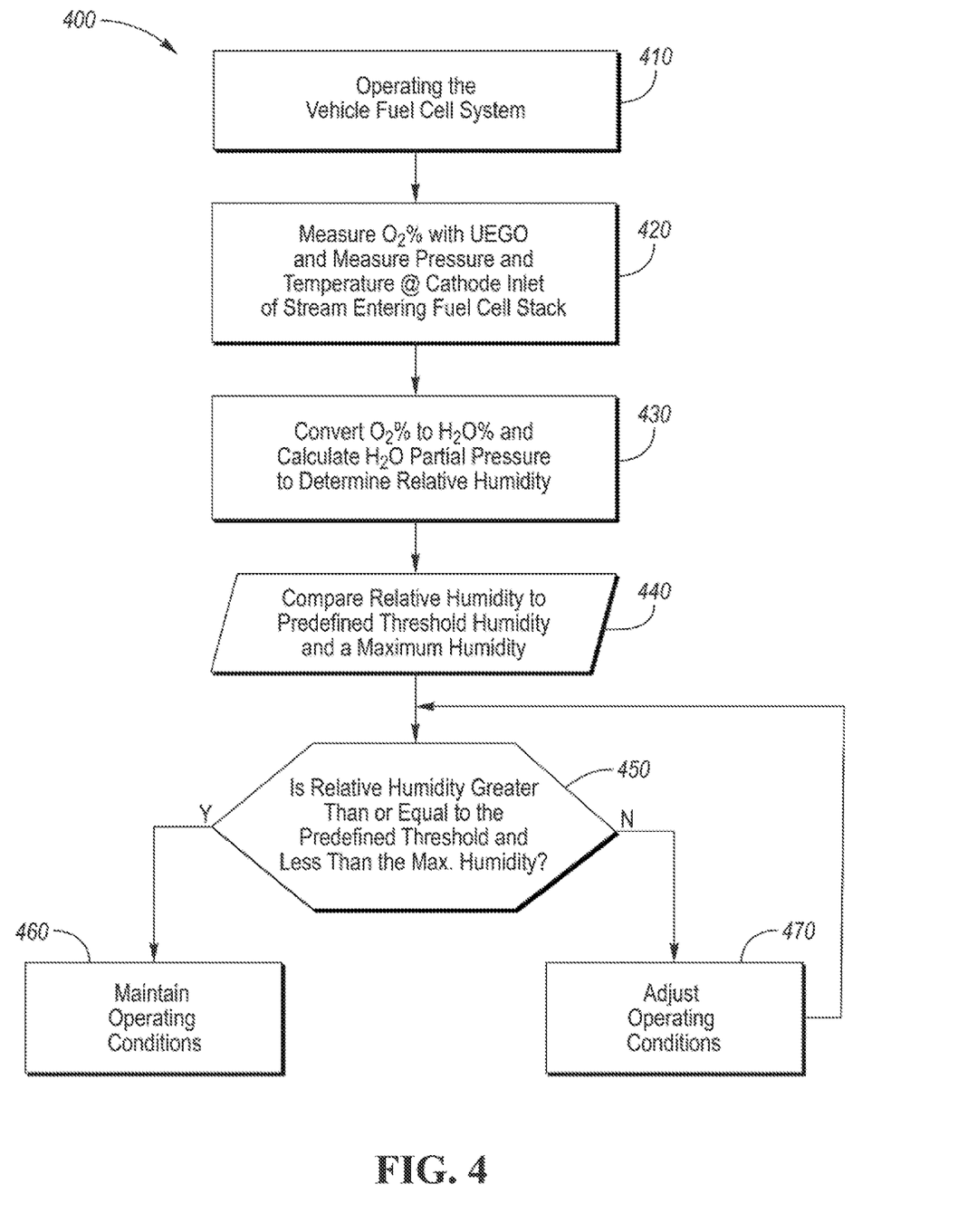
FIG. 4 is a flow chart of a method of operating a fuel cell system, according to another embodiment.

In one or more embodiments, as shown in FIG. 4, a method 400 of operating a fuel cell system is provided. Although the method refers to UEGO sensors, any suitable oxygen sensor may be contemplated. At step 410, the fuel cell stack is operated to provide propulsion to the vehicle. Steps 410 to 440 are similar to those in FIG. 3. At step 440, the relative humidity is compared to a predefined threshold humidity and a maximum humidity. At block 450, if the relative humidity is equal to or above the predefined threshold, and below the maximum humidity, the operating conditions of the system are maintained at step 460 (i.e., the cathode humidifier is operated to maintain the relative humidity above the predefined threshold). If the relative humidity is less than the predefined threshold humidity, at step 470, the controller operates the cathode humidifier and the valves to adjust the relative humidity of the humidified inlet stream until step 450 is satisfied. Similarly, if the relative humidity is above tbc maximum humidity, at step 470, the controller operates the cathode humidifier and the valves to adjust the relative humidity of the humidified inlet stream until step 450 is satisfied. Thus, a healthy fuel stack operation can be achieved to promote the cycle life of the PEM membrane.

The specific placement of the oxygen sensor at the cathode inlet provides an accurate conversion of oxygen content to relative humidity. Dry atmospheric air is composed of about 20.95% oxygen, with the remainder being a about 79.05% mixture of nitrogen, argon, and additional minor gas species. This composition of the air docs not change with pressure and temperature, indicating it holds anywhere with breathable atmosphere, which are the conditions in which the PEM fuel cell slack is operated. Furthermore, this ratio of air composition also holds even with higher pressure, such as after air has been compressed by an air compressor, and also holds at elevated temperatures as in the inlet streams of the fuel cell system. In one or more embodiments, when water vapor (or, interchangeably, water vapor) is the sole additional component and is added to the air stream via the cathode humidifier, the composition of the air changes, while the ratio of oxygen to nitrogen (plus dry remainder) remains unchanged. Thus, content of oxygen in the cathode inlet stream will only decrease as more water vapor is added. Since the UEGO sensor has been specifically designed to measure oxygen concentrations between 0% and 25%, and since there are no other factors involved, the accuracy of this measurement method is defined by the specifications of the oxygen sensor and are therefore comparable to measurement by a conventional specialty humidity sensor, as show n below in the Experimental Results. Since the oxygen sensor, such as the UEGO sensor, measures oxygen partial pressure, the oxygen measurement will require a pressure correction factor, for which pressure correction curves are provided by the sensor suppliers.

Because this conversion from oxygen content to relative humidity is valid only when atmospheric air and single additional water vapor component are mixed, the oxygen sensor cannot be placed in locations where atmospheric air composition is altered by chemical reactions, such as at cathode outlet side of the slack, or within the exhaust pipe of IC engine.

Specifically, the oxygen content at the cathode inlet can be used to determine the relative humidity of the inlet stream, and further adjust the humidity using the cathode humidifier because only water vapor is added to air, limiting the variables and allowing the conversion to relative humidity to apply. The water vapor content of the stream at the cathode inlet can be determined using EQ.1 with the oxygen content measured by the oxygen sensor:

$$O_{2f} = \frac{O_2}{R + O_2 + H_2O} \quad \text{EQ. 1}$$

Where, $O_2$ is the fraction of dry air, and equal to about 0.2095; R is the remainder of air other than $O_2$ when dry, and equal to about 0.7905; and $H_2O$ is the added water vapor content of the dry air. $O_{2f}$ is the $O_2$ fraction when wet (≤0.2095), which is the measurement provided by the UEGO sensor. Using the known composition of air, EQ. 1 can be simplified to EQ. 2:

$$\frac{0.2095}{0.7905 + 0.2095 + H_2O} = \frac{0.2095}{1 + H_2O} \leq 0.2095 \quad \text{EQ. 2}$$

Upon solving EQ. 2 for EQ. 3 provides the added vapor content of the dry air:

$$H_2O = \frac{0.2095}{O_{2f}} - 1 \quad \text{EQ. 3}$$

Finally, to determine $H_2O_f$ the water vapor fraction when wet (humidified) (i.e., the relative humidity), EQ. 4 is substituted with EQ. 3 and simplified to EQ. 5:

$$H_2O_f = \frac{H_2O}{1 + H_2O} \quad \text{EQ. 4}$$

$$\frac{\frac{0.2095}{O_{2f}} - 1}{\frac{0.2095}{O_{2f}}} = 1 - \frac{O_{2f}}{0.2095} \quad \text{EQ. 5}$$

Thus, EQ.5 simplified for the relative humidity $H_2O_f$ is EQ. 6 which can be used by the controller to determine relative humidity at the cathode inlet using an oxygen content measurement from the UEGO sensor:

$$H_2O_f = 1 - \frac{O_{2f}}{0.2095} \quad \text{EQ. 6}$$

Experimental Results

A 18 mm sensor boss was installed for a UEGO sensor located at the cathode inlet to the fuel cell stack. The UEGO sensor used for these tests was a commercially available ZFAS-U3 (part number HS7A-9Y460-BB) oxygen sensor from NTK. NTK also provided the sensor controller which was calibrated to provide oxygen concentration as its output. For comparison, a conventional single probe vaisala humidity sensor (HMT310) (hereinafter, vaisala) was also employed at a location adjacent to the UEGO sensor at the cathode inlet. The output from the Vaisala measured dew point temperature to correlate with the output of the UEGO sensor. After data from the oxygen sensor (relative oxygen concentration) and conventional Vaisala humidity sensor (dew point) were obtained, the appropriate conversions were male so that a comparison could be made for three variables, (1) $H_2O$ volume percent, (2) relative humidity, and (3) dew point temperature. Separately, local pressure and temperature were recorded independently to be used for converting among above three values as needed.

Figure 5:
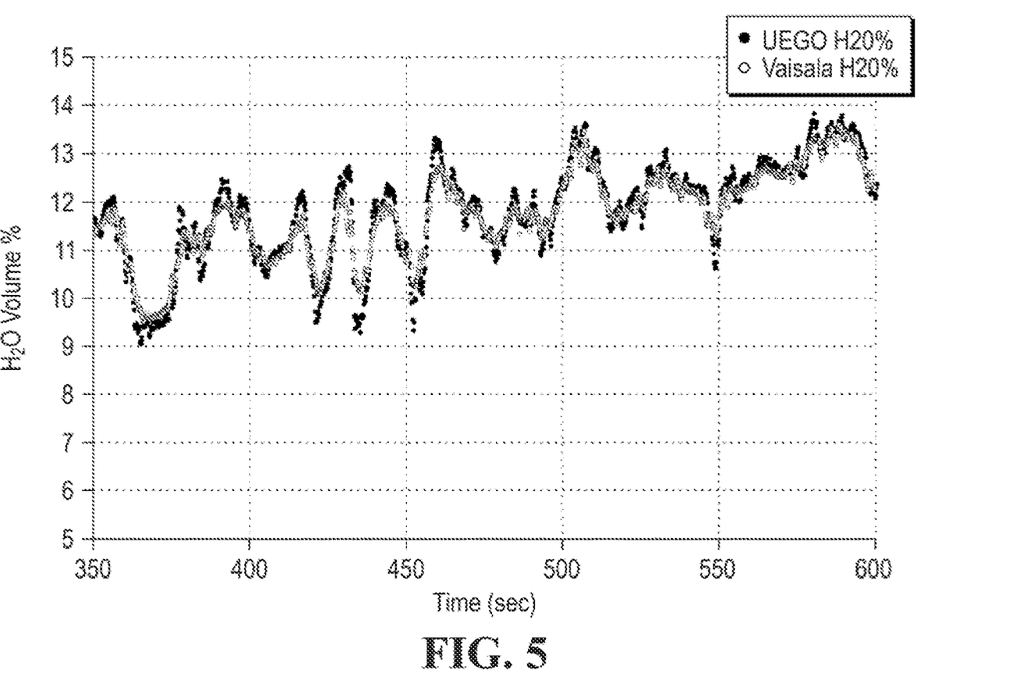
FIG. 5 is a graph showing a comparison in $H_2O$ volume measurements at the cathode inlet between a fuel cell system with a conventional instrument-grade sensor and a fuel cell system according to an embodiment.

FIG. 5 shows the $H_2O$ volume percent comparison between the UEGO sensor and conventional Vaisala sensor at the cathode inlet. Initially the UEGO sensor was calibrated in the laboratory using pure gases of $N_2$ and $O_2$ front Airgas in a flow stand with calibrated mass flow controllers. As previously mentioned, the conversion of raw sensor output (pumping current), to $O_2$ volume percent requires an additional pressure correction from the pressure curves provided with the UEGO sensor. This correction is widely used for applications with the sensor in the exhaust pipe of an IC engine in conjunction with the engine control module. Finally, the corrected $O_2$ concentration was convened to $H_2O$ percent using the conversion process outlined above. For the Vaisala sensor, to convert dew point temperature (sensor output) to $H_2O$ volume percent, dew point pressure is calculated from dew point temperature, and then divided by total (local) pressure. The driving cycle used for the example is the urban dynamometer driving schedule (UDDS), and only 250 sec. duration, front about 350 to 600 seconds from the start is shown in FIG. 5.

Figure 6:
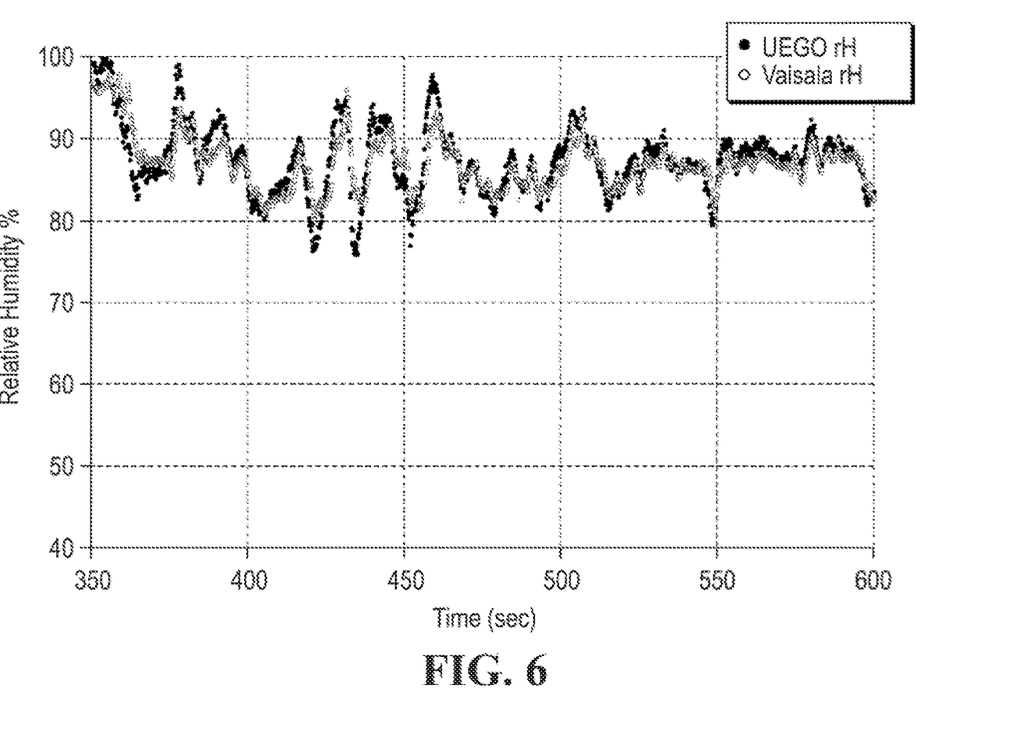
FIG. 6 is a graph showing a comparison in relative humidity at the cathode inlet between a fuel cell system with a conventional instrument-grade sensor and a fuel cell system according to an embodiment.

FIG. 6 shows the relative humidity comparison between the UEGO sensor and the conventional Vaisala sensor at the cathode inlet. The partial pressure for the UEGO sensor was calculated by multiplying the total pressure with $H_2O$ volume percent, and then divided by saturation vapor pressure calculated from the local temperature. The partial pressure for the Vaisala sensor is the dew point pressure as calculated above, divided by lire saturation pressure corresponding to the local temperature.

Figure 7:
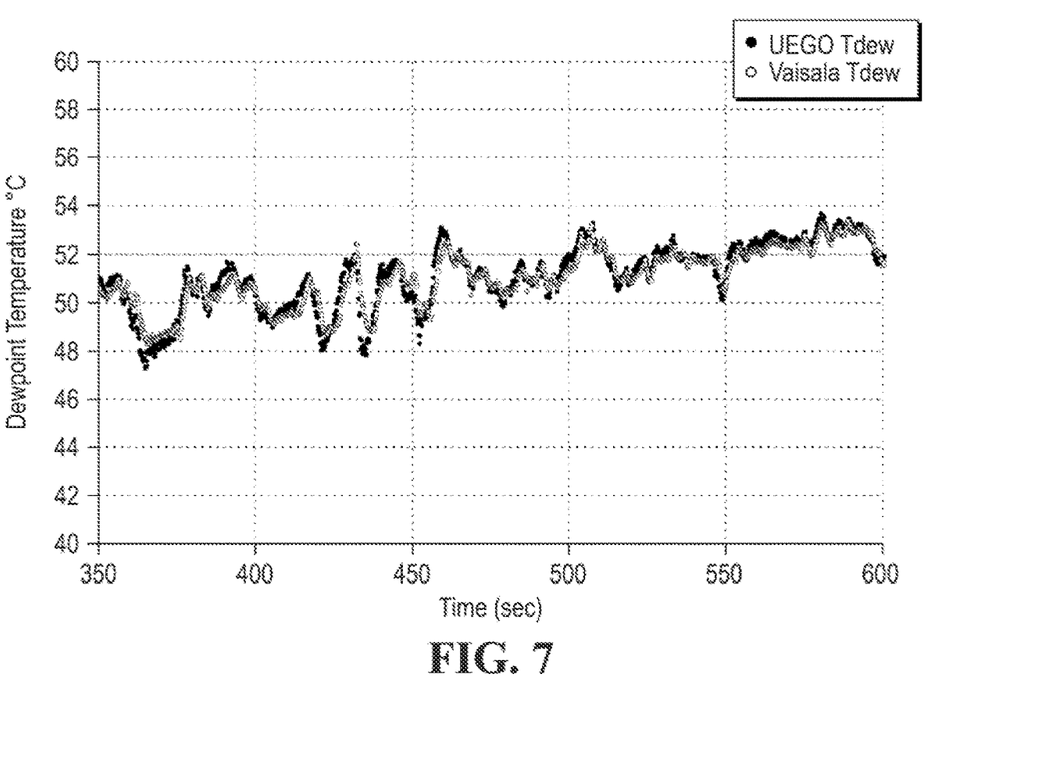
FIG. 7 is a graph showing a comparison in dew point temperature at the cathode inlet between a fuel cell system with a conventional instrument-grade sensor and a fuel cell system according to an embodiment.

FIG. 7 shows the dew point temperature comparison between the UEGO sensor and the conventional Vaisala sensor at the cathode inlet. For the UEGO sensor, the dew point temperature was converted using the partial pressure (calculated above) with dew point pressure to calculate the dew point tempera lure. The Vaisala sensor directly outputs the dew point temperature value.

As shown, the UEGO sensor can provide similar results to the Vaisala sensor, as a less expensive option that is capable of withstanding harsher conditions than the Vaisala sensor. The UEGO sensor has been in successful use for oxygen volume percent measurement under harsh environments for long time and has a proven track record for this purpose. We have shown that with simple numerical conversions, the UEGO sensor could be used for accurately determining water vapor percentage at the cathode inlet of a SOFC stack and that calculating relative humidity or dew point temperature without any additional software or hardware is readily achievable.

Since all three humidity variables as shown in FIGS. 5-7, and described below, are closely related along with given local temperature and pressure, a good correlation of one variable in this example is invariably a good indication of close matching of the remaining two humidity values. Accordingly, the UEGO sensor measurement appears to correlate with the Vaisala value very well as shown in FIGS. 5-7. It should be noted that the plots show that the measurements from the UEGO sensor are typically sharper and have greater magnitude at the peaks since the response time of the UEOO sensor is much shorter than that of Vaisala. Overall, the use of UEGO at the fuel cell stack cathode inlet is well demonstrated for future applications.

As such, a vehicle fuel cell system including a UEGO sensor at the cathode inlet is provided. The UEGO sensor can withstand harsher conditions within the fuel cell system, and provide the oxygen content of the inlet stream at the cathode inlet to determine the relative humidity of the stream. A cathode humidifier can adjust the humidity of the inlet stream based on the measurements of the UEGO sensor and a contoller to enhance performance of the fuel stack and ensure health of the PEM membrane. As such, a less expensive and more durable sensor can be used at the cathode inlet to monitor inlet stream humidity when compared to conventional direct humidity sensors.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel cell system comprising:
   a stack of proton exchange membrane (PEM) fuel cells defining a body, the body including a coolant inlet and coolant outlet, a cathode inlet and cathode outlet corresponding to a cathode, an anode inlet and an anode outlet corresponding to an anode;
   a cathode humidifier fluidly connected to the cathode inlet to provide a humidified inlet stream to the cathode inlet;
   a universal exhaust gas oxygen (UEGO) sensor positioned upstream of the cathode inlet and downstream of the cathode humidifier, and configured to measure oxygen content humidified t stream; and
   a controller connected to the cathode humidifier and the UEGO sensor and configured to operate the cathode humidifier based on the oxygen content of the humidified inlet stream.

2. The fuel cell system of claim 1, further comprising an air compressor fluidly connected to the cathode humidifier to provide an inlet air stream to the cathode humidifier such that water vapor is added to the inlet air stream to form the humidified inlet stream exiting the cathode humidifier.

3. The fuel cell system of claim 2, wherein the cathode humidifier is fluidly connected to the cathode inlet via a valve upstream of the UEGO sensor to control a flow of the humidified inlet stream to the cathode.

4. The fuel cell system of claim 1, further comprising an air compressor fluidly connected to the cathode inlet and providing an inlet air stream upstream of the UEGO sensor and cathode humidifier such that a water vapor stream is added to the inlet air stream from the cathode humidifier to form the humidified inlet stream, and wherein the cathode humidifier is fluidly connected to the inlet air stream by a valve such that the water vapor stream is controlled.

5. The fuel cell system of claim 1, further comprising a temperature sensor and a pressure sensor, both of the temperature and pressure sensors located downstream of the cathode humidifier and upstream of the UEGO sensor.

6. A vehicle comprising:
   a stack of proton exchange membrane (PEM) fuel cells arranged to provide power to the vehicle and defining a body, the body including a coolant inlet and coolant outlet, a cathode inlet and cathode outlet corresponding to a cathode, an anode inlet and an anode outlet corresponding to an anode;
   a cathode humidifier fluidly connected to the cathode inlet to provide a humidified inlet stream to the cathode via the cathode inlet;
   a universal exhaust gas oxygen (UEGO) sensor downstream of the cathode humidifier and upstream of the cathode inlet to measure an oxygen content of the humidified inlet stream; and
   a controller connected to the cathode humidifier and the UEGO sensor and configured to
      determine a relative humidity of the humidified inlet stream based on the oxygen content provided from the UEGO sensor, and,
      upon the relative humidity being less than a predefined threshold humidity, operate the cathode humidifier to increase the relative humidity.

7. The vehicle of claim 6, further comprising an air compressor fluidly connected to the cathode humidifier such that water vapor is added to an inlet air stream to form the humidified inlet stream, and wherein the cathode humidifier is fluidly connected to the cathode inlet via a valve upstream of the UEGO sensor such that the controller operates the valve to control a flow of the humidified inlet stream to the cathode.

8. The vehicle of claim 6, further comprising an air compressor fluidly connected to the cathode inlet and providing an inlet air stream upstream of the UEGO sensor and cathode humidifier such that a water vapor stream is added to the inlet air stream from the cathode humidifier to form the humidified inlet stream.

9. The vehicle of claim 8, wherein the cathode humidifier is fluidly connected to the inlet air stream by a valve such that the controller operates the valve to control the water vapor stream.

10. The vehicle of claim 6, further comprising a temperature sensor and a pressure sensor, the temperature sensor and pressure sensor both being located downstream of the cathode humidifier and upstream of the UEGO sensor, the temperature and pressure sensors providing temperature and pressure data, respectively, to the controller for determining relative humidity.

11. The vehicle of claim 6, wherein the controller is further configured to, upon the relative humidity being more than or equal to the predefined threshold humidity and less than a maximum humidity, operate the cathode humidifier to maintain the relative humidity.

12. The vehicle of claim 11, wherein the controller is further configured to, upon the relative humidity being more than the maximum humidity, operate the cathode humidifier to reduce the relative humidity to below the maximum humidity.

13. A fuel cell system comprising:
   a stack of proton exchange membrane (PEM) fuel cells defining a body, the body including a coolant inlet and coolant outlet, a cathode inlet and cathode outlet corresponding to a cathode, an anode inlet and an anode outlet corresponding to an anode;
   a cathode humidifier fluidly connected to the cathode inlet to provide a humidified inlet stream to the cathode inlet;
   a universal exhaust gas oxygen (UEGO) sensor positioned upstream of the cathode inlet and downstream of the cathode humidifier, and configured to measure oxygen content of the humidified inlet stream; and
   a controller connected to the cathode humidifier and the UEGO sensor and configured to operate the cathode humidifier based on be oxygen content of the humidified inlet stream such that upon a relative humidity being less than a predefined threshold humidity, the cathode humidifier increases the relative humidity, and upon the relative humidity being more than or equal to the predefined threshold humidity and less than a maximum humidity, the cathode humidifier maintains the relative humidity.

14. The fuels cell system of claim 13, wherein the controller is further configured to, upon the relative humidity being more than the maximum humidity, operate the cathode humidifier to reduce the relative humidity to below the maximum humidity.

15. The fuel cell system of claim 13, further comprising an air compressor fluidly connected to the cathode humidifier to provide an inlet air stream to the cathode humidifier such that water vapor is added to the inlet air stream to form the humidified inlet stream exiting the cathode humidifier, and the cathode humidifier is fluidly connected to the cathode inlet via a valve upstream of the UEGO sensor to control a flow of the humidified inlet stream to the cathode.

16. The fuel cell system of claim 13, further comprising an air compressor fluidly connected to the cathode inlet and providing an inlet air stream upstream of the UEGO sensor and cathode humidifier, wherein the cathode humidifier is fluidly connected to the inlet air stream by a valve that controls a water vapor stream added to the inlet air stream to form the humidified inlet stream.

17. The fuel cell system of claim 13, further comprising a temperature sensor and a pressure sensor, both of the temperature and pressure sensors located downstream of the cathode humidifier and upstream of the UEGO sensor.

* * * * *